(12) United States Patent
Popovski et al.

(10) Patent No.: US 8,131,688 B2
(45) Date of Patent: Mar. 6, 2012

(54) STORAGE SYSTEM DATA COMPRESSION ENHANCEMENT

(75) Inventors: Vladimir Popovski, Irvine, CA (US); Nelson Nahum, Tustin, CA (US)

(73) Assignee: LSI Corporation, Milpitas, CA (US)

( * ) Notice: Subject to any disclaimer, the term of this patent is extended or adjusted under 35 U.S.C. 154(b) by 371 days.

(21) Appl. No.: 12/548,303

(22) Filed: Aug. 26, 2009

(65) Prior Publication Data

US 2011/0055174 A1 Mar. 3, 2011

(51) Int. Cl.
*G06F 7/00* (2006.01)
*G06F 17/00* (2006.01)
(52) U.S. Cl. ........................ 707/693; 707/692
(58) Field of Classification Search ............... None
See application file for complete search history.

(56) References Cited

U.S. PATENT DOCUMENTS

| | | | |
|---|---|---|---|
| 5,394,534 A * | 2/1995 | Kulakowski et al. | 711/112 |
| 5,561,421 A * | 10/1996 | Smith et al. | 341/51 |
| 7,814,129 B2 * | 10/2010 | Williams | 707/812 |
| 2006/0184505 A1 * | 8/2006 | Kedem et al. | 707/1 |
| 2006/0294128 A1 * | 12/2006 | Gottschalk | 707/101 |
| 2008/0294660 A1 * | 11/2008 | Patterson et al. | 707/100 |
| 2010/0313040 A1 * | 12/2010 | Lumb | 713/193 |

* cited by examiner

*Primary Examiner* — Kuen Lu
*Assistant Examiner* — Tuan A Pham
(74) *Attorney, Agent, or Firm* — Smith Risley Tempel Santos LLC

(57) ABSTRACT

Data segments are logically organized in clusters in a data repository of a data storage system. Each clusters contains compressed data segments and data common to the compression of the segments, such as a dictionary. In association with a write request, it is determined in which of the clusters would the data segment most efficiently be compressed, and the data segment is stored in that data cluster.

20 Claims, 10 Drawing Sheets

STORAGE SYSTEM DATA COMPRESSION
ENHANCEMENT

CROSS-REFERENCE TO RELATED PATENT APPLICATION

Co-pending U.S. patent application Ser. No. 12/504,426, filed Jul. 16, 2009, entitled "BLOCK-LEVEL DATA DE-DUPLICATION USING THINLY PROVISIONED DATA STORAGE VOLUMES," is related by subject matter.

TECHNICAL FIELD OF THE INVENTION

The invention relates to data compression in data storage systems.

BACKGROUND OF THE INVENTION

A typical data storage system includes one or more arrays of magnetic disk drives or similar non-volatile storage devices, and a controller that controls the manner and locations in which data is stored in and retrieved from the devices. It is known to provide data compression in a data storage system to maximize efficiency of use of available storage space. However, there is a need for improved compression schemes in data storage systems. An improved compression scheme may be particularly useful in, for example, a data storage system in which data de-duplication is employed.

Storing redundant data in a data storage system can be inefficient. Although some forms of data storage redundancy, such as RAID (redundant arrays of inexpensive disks), in which the redundancy promotes reliability, can be useful, other forms of data storage redundancy can be wasteful and an inefficient use of storage resources. For example, in some computer systems, multiple hosts or processes frequently access the same data in the same storage system. Absent any measures to the contrary, each host or process causes the storage system to store the data in a location (e.g., an area on a disk) independently of any other host that may cause the storage system to store the same data in another location (e.g., another area on the disk or another disk).

Data de-duplication is a term that is commonly used to describe methods for reducing undesirable data storage redundancy. Data de-duplication can be employed in various computing system environments, and is especially useful in an environment in which data is backed up to a secondary storage system, as backed-up data typically comprises a large amount of redundant data, i.e., data that is duplicative of data that has been previously backed up. Networked e-mail is another environment in which data-de-duplication may be useful, as multiple users commonly have access to copies or duplicates of the same e-mail message.

Data de-duplication can be performed either in real-time, as the data is received for storage (i.e., "in-line"), or after the data has been stored (i.e., "post-processing"). Data de-duplication can be performed at the source, i.e., the host or filesystem that requires access to the data, or at the destination, i.e., the data storage system. Data de-duplication can be performed on a per-file basis or on blocks into which the data has been partitioned. In block-level de-duplication, the blocks can be of fixed size or variable size. Each of these data de-duplication parameters has advantages and disadvantages.

Data de-duplication methods fall into one of two main categories: hash-based or byte-level delta. Hash-based data de-duplication involves partitioning the data into blocks or segments and applying a cryptographic algorithm (colloquially referred to as a "hash" algorithm) to each data segment to produce a hash code or identifier that identifies the segment. Multiple references to this hash code can be stored to accommodate the multiple instances in which various hosts or processes reference the data identified by the hash code, but only a single copy of the data segment itself is stored. Efficiency is achieved because less storage area is required to store the hash codes and multiple references thereto than to store multiple copies of the data itself. Hash-based data de-duplication is commonly performed in-line, i.e., as data is received for storage. As each segment is received, it can be determined whether it is duplicative of data already in storage by applying the hash algorithm and comparing the hash code to those that have been stored. A strong hash algorithm minimizes the likelihood of collision, i.e., that two different data segments will yield the same hash code. However, a strong hash algorithm can inefficiently consume computation (i.e., central processing unit or CPU) resources. Also, providing a unique hash code for every unique data segment requires storage and retrieval of a large number of hash codes and references thereto, thereby inefficiently consuming storage resources. Each hash code itself must be large (i.e., many bytes long) to uniquely identify each unique data segment.

Byte-level delta data de-duplication involves comparing multiple versions of data over time and storing only the byte-level differences (i.e., delta) that occur between versions. Byte-level delta data de-duplication is commonly performed as post-processing, i.e., after the data has been stored on disk.

SUMMARY

The invention relates to an enhancement for a data storage system that provides data compression. In accordance with exemplary embodiments, the data storage system has a data repository in which data segments are organized in clusters. Each cluster in the data repository stores compressed data segments along with data that is common to all of the compressed data in the cluster. When a data segment is provided in association with a write request, two or more candidate clusters are identified. For each candidate cluster, the data segment is compressed using the common data of the candidate cluster. The results of compressing the data segment using the common data of each candidate cluster are compared with one another or otherwise evaluated against one or more criteria, and the candidate cluster in which the data segment is most efficiently compressed is identified and selected. For example, the candidate cluster having common data that would be least expanded by compressing the data segment can be selected. Alternatively, for example, the candidate cluster that provides the highest compression ratio for the data segment can be selected. The compressed data segment is then added to the selected candidate cluster and the common data updated.

DETAILED DESCRIPTION OF AN ILLUSTRATIVE EMBODIMENT

Figure 1:
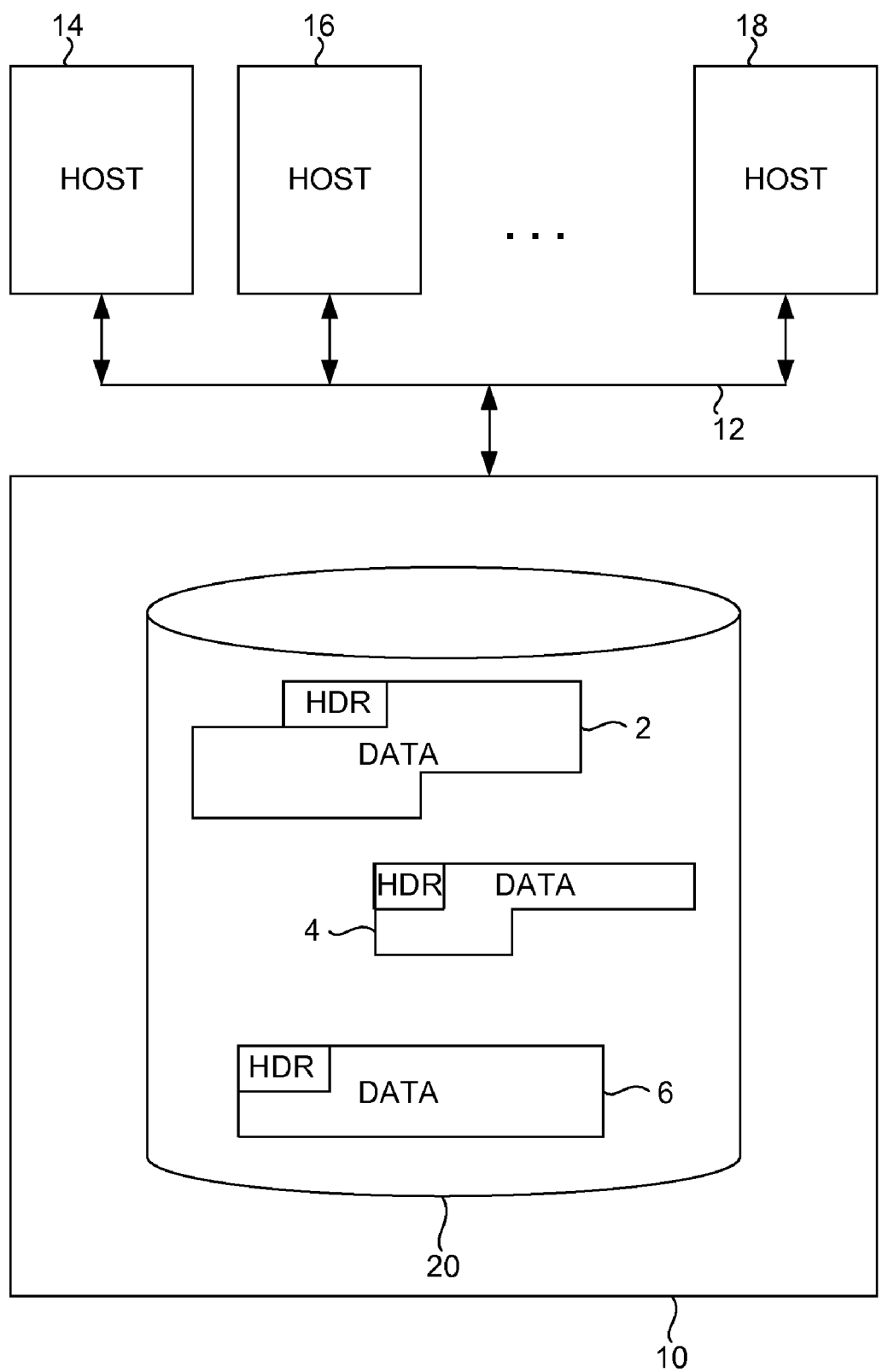
FIG. 1 is a block diagram of a data storage system having a compression cluster feature, in accordance with an exemplary embodiment of the invention.

As illustrated in FIG. 1, in an illustrative or exemplary embodiment of the invention, a data storage system 10 communicates via a data network 12 with a number of hosts (computer systems) 14, 16, 18, etc. Although in the exemplary embodiment hosts 14, 16, 18, etc., are described for purposes of clarity of illustration as separate systems, e.g., in physically distinct computers, in other embodiments they can be virtual hosts that share a computer system with each other or with other elements. Data storage system 10 can be, for example, a fileserver or other network server, a RAID (redundant array of inexpensive disks), SAN (storage area network) system, or any other system in which data can be stored in and retrieved from one or more persistent storage devices, such as disks 20. Only the elements of data storage system 10 that are relevant to the exemplary embodiment of the invention are illustrated, and elements relating to other functions, such as file or database management, mirroring, etc., are not shown for purposes of clarity. Although the persistent storage devices can include any number of devices of any suitable storage media type, arranged and connected with each other and other elements of data storage 10 in any suitable manner, they are referred to herein as disks 20 for purposes of illustration.

Each of hosts 14, 16, 18, etc., can initiate read and write operations, i.e., requests, on data storage system 10. A read operation can include information identifying a logical volume address and the number of bytes to be read beginning at that address. In response to a read operation, data storage system 10 reads the data from disks 20 and returns it to the requesting host. A write operation can include data and the logical volume address to which the data is to be written. In response to some write operations, data storage system 10 writes the data to disks 20 and returns to the requesting host an indication that the write operation was completed.

As further illustrated in FIG. 1, data can be stored in clusters 2, 4, 6, etc., in data storage system 10. Each cluster 2, 4, 6, etc., includes a header and compressed data segments. The header includes data that is common to all of the compressed data segments of the cluster and can also include information about locations of compressed data segments within the cluster. It should be noted that the boundaries and relative sizes and locations of clusters 2, 4 and 6 shown in FIG. 1 are intended only to be illustrative. Similarly, although for purposes of illustration in the exemplary embodiment the header is shown in FIG. 1 to be located at the beginning or head of each cluster, 2, 4, 6, etc., the header or other common data relating to each cluster can be stored in any suitable location in data storage system 10.

The purpose of the clusters is to group or cluster those data segments together that can be most efficiently compressed with each other. Any suitable compression algorithm or algorithms known in the art can be used. For example, a dictionary-based compression algorithm, such as the well-known Lempel-Ziv-Welch (LZW) algorithm, can be used. As well understood in the art, a dictionary-based algorithm uses a "dictionary" that relates code words to the strings or other data that the code words replace. The dictionary can be in the form of a tree (data structure), for example. In the exemplary embodiment, the common data in the header of each cluster 2, 4, 6, etc., includes a dictionary. The entries in the dictionary include the code words resulting from the compression of the data segments of the cluster.

Figure 2:
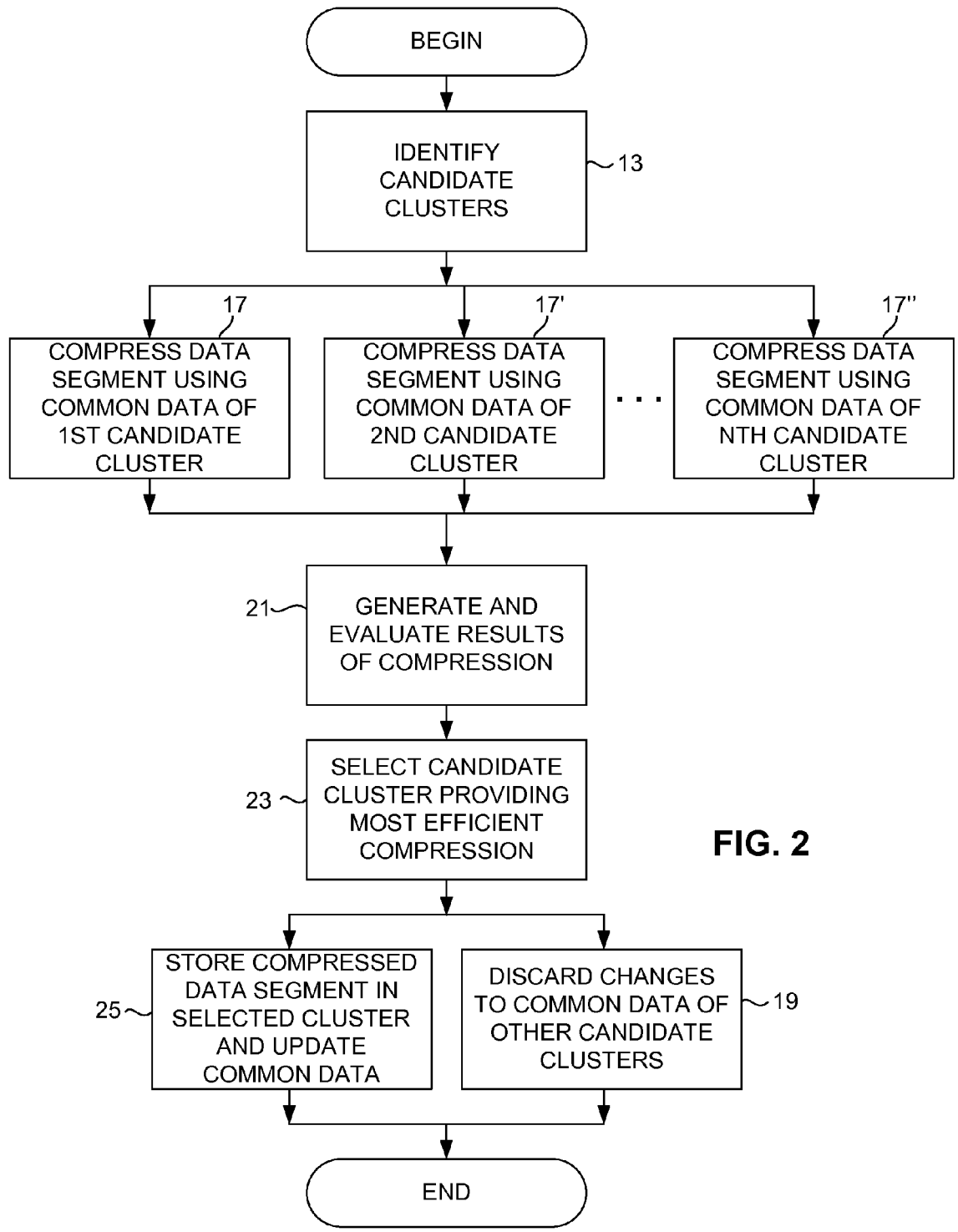
FIG. 2 is a flow diagram, illustrating a method relating to data compression in the system of FIG. 1.

Although the system and method are described in further detail below, the general method is illustrated by the flow diagram of FIG. 2. In response to a write request and associated new data segment to be written, data storage system 10 attempts to determine in which cluster to store the data segment. The method involves data storage system 10 identifying two or more candidate clusters and evaluating the efficiency with which the data segment could be compressed in each candidate cluster. As indicated by block 13, data storage system 10 identifies two or more candidate clusters by determining which clusters are open. In the exemplary embodiment, each cluster has a maximum size. Once the cluster reaches the maximum size, it is closed to additional data segments. In other embodiments, however, cluster size can be open-ended, and an essentially unlimited number of data segments can be included in each cluster. If it is determined that a cluster is not open, i.e., it is closed, then it is not included in the candidate clusters. If it is determined that a cluster is open, then data storage system 10 includes that cluster in the candidate clusters.

Data storage system 10 compresses the data segment using the common data (e.g., a dictionary) of each of the identified candidate clusters. For N candidate clusters, these compressions can be performed in parallel, as indicated by blocks 17, 17', 17". Each compression represents, in effect, tentatively adding the compressed data segment to the corresponding candidate cluster. Also, although for purposes of illustration FIG. 2 indicates that candidate clusters are first identified and then provided to one or more compression engines (not shown), it should be understood that the blocks shown in FIG. 2 are intended only to be exemplary, and the functions or operations that they represent can be combined with those of other blocks. For example, in other embodiments data storage system 10 can identify candidate clusters and provide them to compression engines in a single operation.

As indicated by block 21, data storage system 10 generates compression results for each candidate cluster that include data relating to the compression of the data segment using that cluster's dictionary or other common data. As persons skilled in the art understand, the more similar the data segment is to data segments of a candidate cluster, the more efficiently the data segment will compress when that candidate cluster's dictionary is used. The results can include, for example, a measure of the extent to which compressing the data segment in the candidate cluster would expand that candidate cluster's dictionary. The more different the data segment is from data segments of a candidate cluster, the more additional dictionary entries will be generated by compressing the data segment. The compression results can include such (tentative) additional dictionary entries or other (tentative) new common data that is generated as a result of compressing the data segment. The extent can be expressed by the difference in size between the dictionary prior to the compression of the data segment (using that candidate cluster's existing dictionary entries) and the dictionary after compression of the data segment, i.e., with the addition of the new dictionary entries. The size difference can be measured in any suitable manner, such as by the increase in volume of data, depth of a tree, etc.

As indicated by block 23, data storage system 10 then evaluates the compression results to determine a compression efficiency for each candidate cluster. Efficiency can be quantified or defined in any suitable way, such as by the above-described increase in dictionary size. The smaller the increase in dictionary size that would result from compressing the data segment in the candidate cluster, the more efficient the compression. Alternatively, or in addition, efficiency can be quantified or defined by a compression ratio, i.e., the size of the compressed data segment compared with the size of the uncompressed data segment. These methods of evaluating compression results and determining compression efficiency can be used separately or, alternatively, together with each other or with other methods. For example, in the exemplary embodiment an algorithm can produce a measure of efficiency in response to a combination of dictionary size increase and compression ratio. The algorithm can assign a weight to the dictionary size increase and a different weight to the compression ratio. Alternatively, the algorithm can assign the same weight to the dictionary size increase and compression ratio. It should be noted that dictionary size increase and compression ratio intended only as examples of compression results that can be generated from compression of the data segment for the candidate clusters. Other compression results that can be evaluated to determine compression efficiency will occur readily to persons skilled in the art in view of the teachings herein.

A candidate cluster is then selected in response to the efficiency. This candidate cluster can be selected in any suitable manner, such as by comparing the compression efficiencies for all candidate clusters with each other and selecting the candidate cluster that would provide the highest compression efficiency if the data segment were compressed using its dictionary. That is, the candidate cluster in which the data segment would most efficiently compress is selected. Alternatively, a candidate cluster can be selected by selecting any candidate cluster that would provide a compression efficiency exceeding some predetermined threshold.

As indicated by block 25, the data segment is stored in the selected cluster, and the dictionary or other common data of the selected cluster is updated to include the new dictionary entries or other common data. It should be noted that if adding the data segment to a cluster results in the cluster size exceeding the maximum cluster size, that cluster will be considered closed to new data segments. As indicated by block 19, the expanded or new common data or other compression results resulting from the compression of the data segment using the common data of candidate clusters other than the selected one, which in effect represented tentatively adding the compressed data segment to those clusters, can be discarded.

Figure 3:
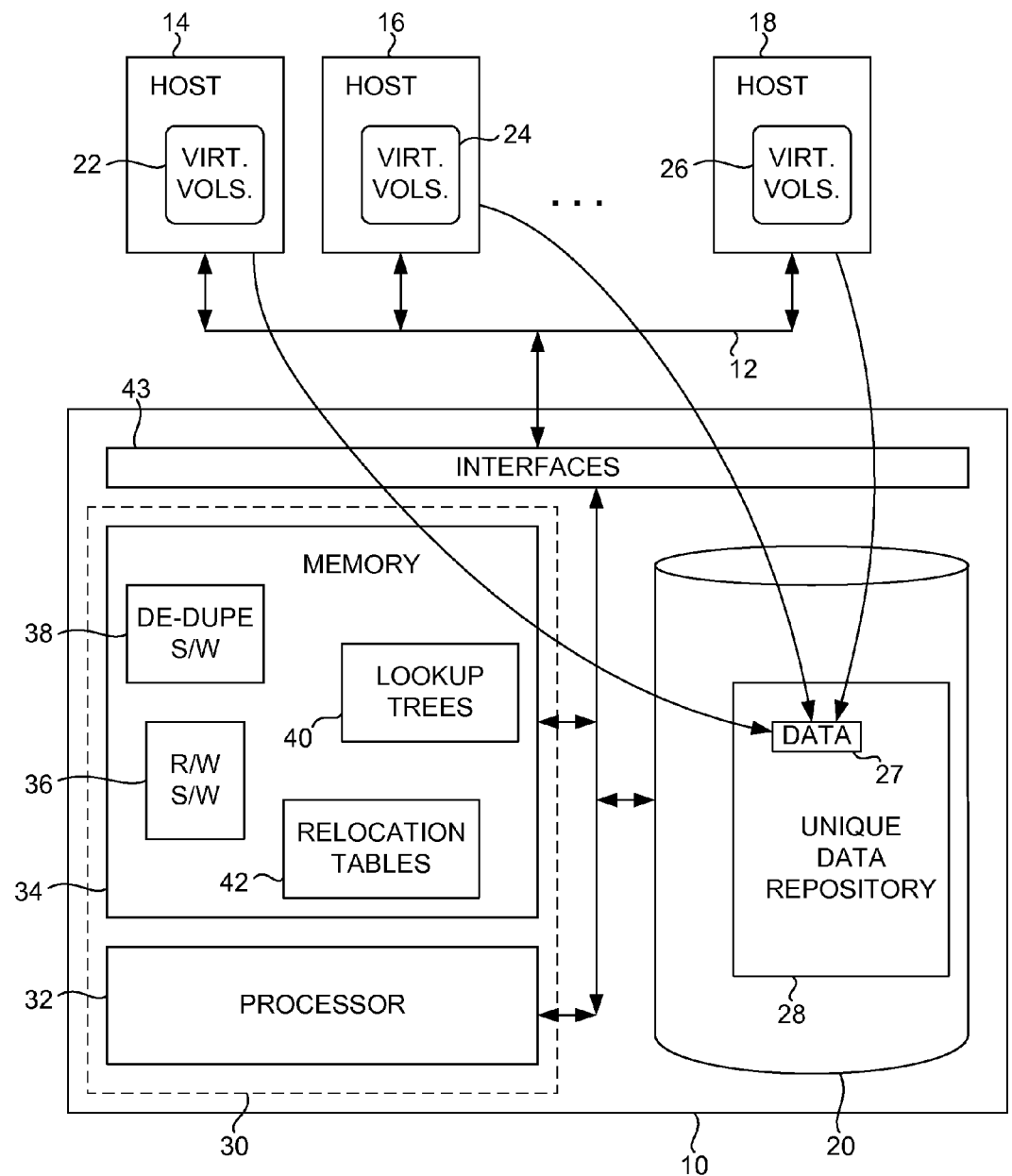
FIG. 3 is a block diagram of a data storage system having the compression cluster feature and a data de-duplication feature, in accordance with an exemplary embodiment of the invention.

As conceptually illustrated by the arcuate arrows in FIG. 3 between some exemplary "data" 27 and hosts 14, 16, 18, etc., more than one host or process may access, i.e., store and retrieve, the same data. In the exemplary embodiment, data storage system 10 inhibits duplication of such data and promotes storage of only a single, unique instance of such data while maintaining different logical references to the data for each host or process that accesses the data. In the exemplary embodiment, a unique data repository 28 is created in disks 20 or physical volumes representing the storage space on disks 20. Unique data repository 28, which is a logical structure or data structure, is described in further detail below. Note that the clusters described above with regard to FIG. 1 are not shown in FIG. 3 for purposes of clarity. However, data stored in unique data repository 28 is stored in the above-described clusters.

Before data storage system 10 is used, i.e., before receiving a read request or write request from hosts 14, 16, 18, etc., data storage system 10 is initialized. When data storage system 10 receives an indication to perform initialization, it can allocate storage space in disks 20 or other persistent storage for storing metadata that represents virtual volumes 22, 24, 26, etc. As noted above, little storage space is needed for such metadata, as the address space or virtual capacity of virtual volumes 22, 24, 26, etc., can be expanded dynamically as new data is stored. It should be noted that no storage space at all need be allocated in disks 20 or other persistent storage for the data (i.e., data segments) itself, as such storage space can likewise be allocated dynamically in unique data repository 28 as new data is stored.

Although storage system 10 can have any suitable structure or architecture that enables it to control or otherwise effect the functions described herein, FIG. 3 illustrates an exemplary structure in which the functions are performed at least in part under the control of software elements. The combination of such software or firmware elements and the hardware elements with which they interact constitutes a programmed processor system 30 that is programmed or configured to effect the functions or methods of operation described herein. Programmed processor system 30 includes at least a processor 32 or similar device and some suitable memory 34. Although memory 34 is shown for purposes of clarity as a single or unitary element, it should be understood that memory 34 can include memory devices of any suitable type and number, including, for example, non-volatile memory such as FLASH memory, (volatile) random-access memory, etc. Similarly, processor 32 can include one or more devices.

Programmed processor system 30 can effect the writing of data to and reading of data from disks 20 under control of a read/write software element 36. Programmed processor system 30 can also effect the data de-duplication methods described below under control of a de-duplication software element 38. Additional software elements, including lookup trees 40 and relocation tables 42 are also described below with regard to the data de-duplication methods. These software elements are shown as separate and distinct for purposes of illustration but can be organized in any suitable manner, including being combined with each other or with other elements, divided into additional elements, etc. Storage system 10 can further include various suitable interfaces 43 that aid interfacing it with hosts 14, 16, 18, etc.

Also, although the above-described software elements are depicted for purposes of illustration as stored in or residing in memory 34, as persons skilled in the art to which the invention relates understand, such software elements may not reside simultaneously or in their entireties in memory 34 or other such storage medium. Rather, in accordance with conventional computing principles, such software elements can be retrieved into memory 34 in portions (e.g., instructions, code segments, files, libraries, etc.) on an as-needed basis from one or more suitable sources, such as disks 20 or other storage devices, via network 12 from a remote device, etc. Much of lookup trees 40 and relocation tables 42, for example, can remain stored on disks 20, while only the portions of them that are needed at any given time are cached in memory 34. It should be noted that the combination of one or more of above-described software elements or portions thereof and memory 34, disks 20 or other computer-readable medium on which they are recorded constitutes a "computer program product" as that term is used in the patent lexicon.

Furthermore, although in the exemplary embodiment the data storage devices (disks 20) are shown as residing within data storage system 10, in other embodiments the data storage devices can be separate from the elements that perform the functions ascribed to programmed processor system 30 in the exemplary embodiment. That is, such data storage devices can be separate from, i.e., external to, storage system 10. Similarly, although in the exemplary embodiment data network 12 provides communication between hosts 14, 16, 18, etc., and storage system 10, in other embodiments such communication can occur through any suitable physical or logical communication channels between any physical or logical hosts and the elements that perform the functions ascribed to programmed processor system 30 in the exemplary embodiment. For example, such communication can occur entirely or primarily within a single computer, without any external data network. In still other embodiments, some or all of the functions ascribed herein to programmed processor system 30 can be performed by one or more of the hosts themselves.

Figure 4:
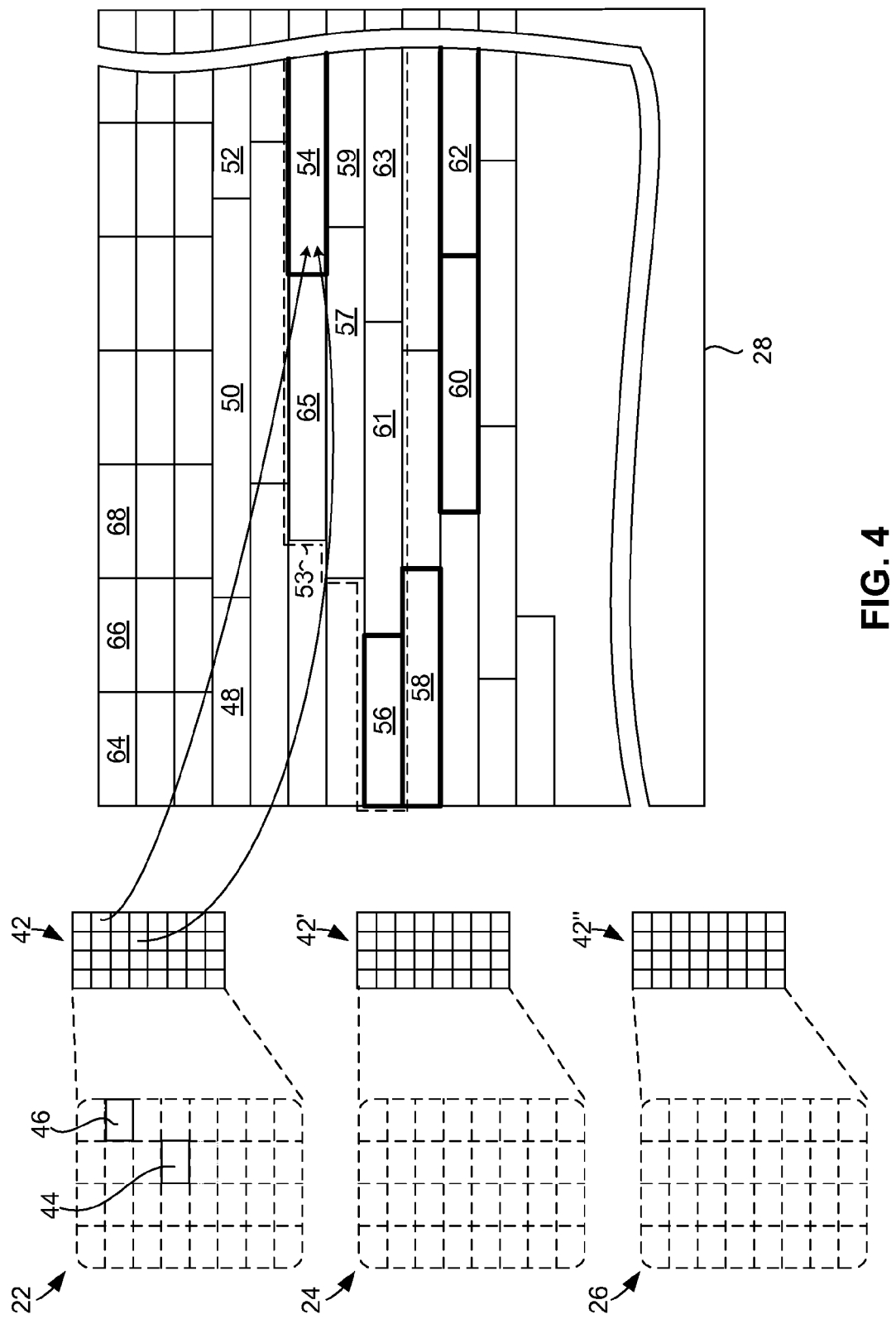
FIG. 4 illustrates a data repository, relocation tables, and virtual volumes, in accordance with the exemplary embodiments.

As illustrated in FIG. 4, logical or virtual volumes 22, 24, 26, etc., are the means by which a host (or a process running on the host) keeps track of stored data. Logical or virtual volume addresses need not correspond to storage locations on disks 20 or other persistent storage at which data is physically recorded. For example, storage system 10 may operate upon an address space in disks 20 (e.g., organized as (physical) volumes) that is much smaller than the virtual address space upon which a host 14, 16, 18, etc., operates. Indeed, as described in further detail below, little or no virtual address space need be allocated to virtual volumes 22, 24, 26, etc., as their address space or virtual capacity can be expanded dynamically as new data is stored. The effect of the potentially much smaller size of the physical address space of disks 20 than the virtual address space used by hosts 14, 16, etc., and the dynamic address space allocation can be referred to as "thin provisioning" of disks 20. From the host's perspective, the data is stored on the virtual volume, i.e., in the virtual address space, even though the data is physically stored on disks 20 (or physical volumes into which the storage space of disks 20 may be organized).

Each of the exemplary segment locations 48, 50, 52, 54, 56, 58, 60, 62, etc., shown in data repository 28 indicates a location in which a data segment is stored in compressed form. Because the data segments are compressed, their sizes or lengths can differ. The (compressed) data segments are stored in, i.e., organized into, the above-described clusters.

For example, an exemplary cluster 53 includes data segments stored at segment locations 54, 56, 57, 59, 61 and 63 among others. Cluster 53 includes a header 65. Header 65 includes a segment identifier and corresponding offset (not shown for purposes of clarity) for each data segment stored in cluster 53. The segment identifier uniquely identifies a data segment. The offset indicates the location within the cluster, with respect to the beginning of the cluster, at which the identified data segment is stored. Although referred to as a "header" for convenience, the header need not be stored in the beginning of each cluster or at any other particular location.

In writing data to storage system 10 or reading data from storage system 10, a host includes a virtual volume address as part of or otherwise in association with the read or write request. A relocation table 42 can be used to determine, in response to a virtual volume address, a segment location in data repository 28. That is, elements of relocation table 42 can indicate corresponding segment locations in data repository 28. For example, the information representing the elements of relocation table 42 can be in a form that allows it to be converted into addresses in data repository 28. In the exemplary embodiment, for example, each element of relocation table 42 can include the above-referenced cluster identifier and segment identifier. The cluster identifier can point to or otherwise identify the cluster in which the segment is located, such as exemplary cluster 53. The offset corresponding to the segment identified by the segment identifier can then be used to locate the data segment within the cluster. For example, an element of relocation table 42 corresponding to a requested data segment may provide a cluster identifier indicating that the requested data segment can be found in cluster 53. The segment identifier provided by the same element of relocation table 42 may indicate an offset from the beginning of cluster 53 that, when added to the beginning address or other base location of cluster 53, results in the identification of, for example, segment location 56.

Relocation tables 42 can comprise any number of individual tables or similar structures, but for purposes of illustration each of virtual volumes 22, 24, 26, etc., is shown in FIG. 4 as corresponding to one of relocation tables 42.

In an example illustrated in FIG. 4, two virtual volume addresses 44 and 46 in, for example, virtual volume 22 correspond to elements in one of relocation tables 42. In this example, the two elements to which virtual volume addresses 44 and 46 correspond indicate or correspond to the same segment location 54 (and, accordingly, also indicate or correspond to the same (compressed) data segment stored at segment location 54). In this example, in response to virtual volume address 44 associated with a read request, it can be determined from relocation table 42 that data (i.e., a compressed data segment) is to be read from segment location 54 in data repository 28. Likewise, in response to virtual volume address 46 associated with a read request, it can be determined from relocation table 42 that data is to be read from segment location 54 in data repository 28. It should be noted that although for purposes of illustration in the exemplary embodiment each of virtual volumes 22, 24, 26, etc., is associated with a different one of hosts 14, 16, 18, etc., a single host or process can access any number of virtual volumes.

Each segment has a corresponding reference counter 64, 66, 68, etc. As described in further detail below, a reference counter maintains a count of the number of instances in which the corresponding segment is referenced in a relocation table 42. For example, a reference counter corresponding to the segment stored at segment location 54 can have a value of two, indicating that it is referenced by two elements in that relocation table 42, corresponding to virtual addresses 44 and 46. Although in the exemplary embodiment the locations of reference counters 64, 66, 68, etc., are shown for purposes of illustration in one area of data repository 28 and exemplary segment locations 48, 50, 52, 54, 56, 58, 60, 62, etc., in another area of data repository 28, data repository 28 can be organized in any other suitable manner. Furthermore, although data repository 28 is shown as a unitary element in FIG. 2 for purposes of illustration, reference counters, data segments and other elements can be distributed among any number and type of storage structures or devices.

As further illustrated in FIG. 4, data segments are organized in groups in data repository 28. For example, a group can include (data segments stored at) segment locations 54, 56, 58, 60 and 62, highlighted in bold line in FIG. 4. A group identifier (e.g., a number), is assigned to each group as the group is created in order to identify the group. A group identifier is generated in response to a data segment and a hash algorithm. That is, the data segment is input to a hash algorithm, which produces a hash code or key, referred to herein as a group identifier because in the context of the present invention it is used to identify the groups. There can be any number of groups, depending upon the selected size of the group identifier. For example, for a 32-bit group identifier, there can be up to $2^{32}$ groups. Any suitable hash algorithm can be used, such as, for example, that which is commonly known as CRC32, or a combination of CRC32 and that which is commonly known as S-Box (substitution box). Using a hash algorithm to generate a group identifier, it can quickly and efficiently be determined to which of a number of groups a segment belongs. The group identifier can be relatively short in comparison with hash keys used in some prior hash-based de-duplication methods, because the group identifier need not uniquely identify every unique data segment that is stored in data repository 28; rather, it need only identify groups of data segments, where each group can include a number of data segments.

In addition to the above-described segment identifiers and offsets, the header (e.g., header 65 of exemplary cluster 53) includes common data, i.e., data that is common to all data segments of the cluster. In the exemplary embodiment, the common data comprises the dictionary for the cluster. It should be noted that there is no inherent relationship between clusters and groups. For example, while data segments stored at segment locations 54 and 56 are members of the same group and cluster, data segments stored at segment locations 58, 60 and 62 are members of that group but not members of that cluster, and data segments stored at segment locations 57, 59, 61 and 63 are members of that cluster but not members of that group.

Figure 5:
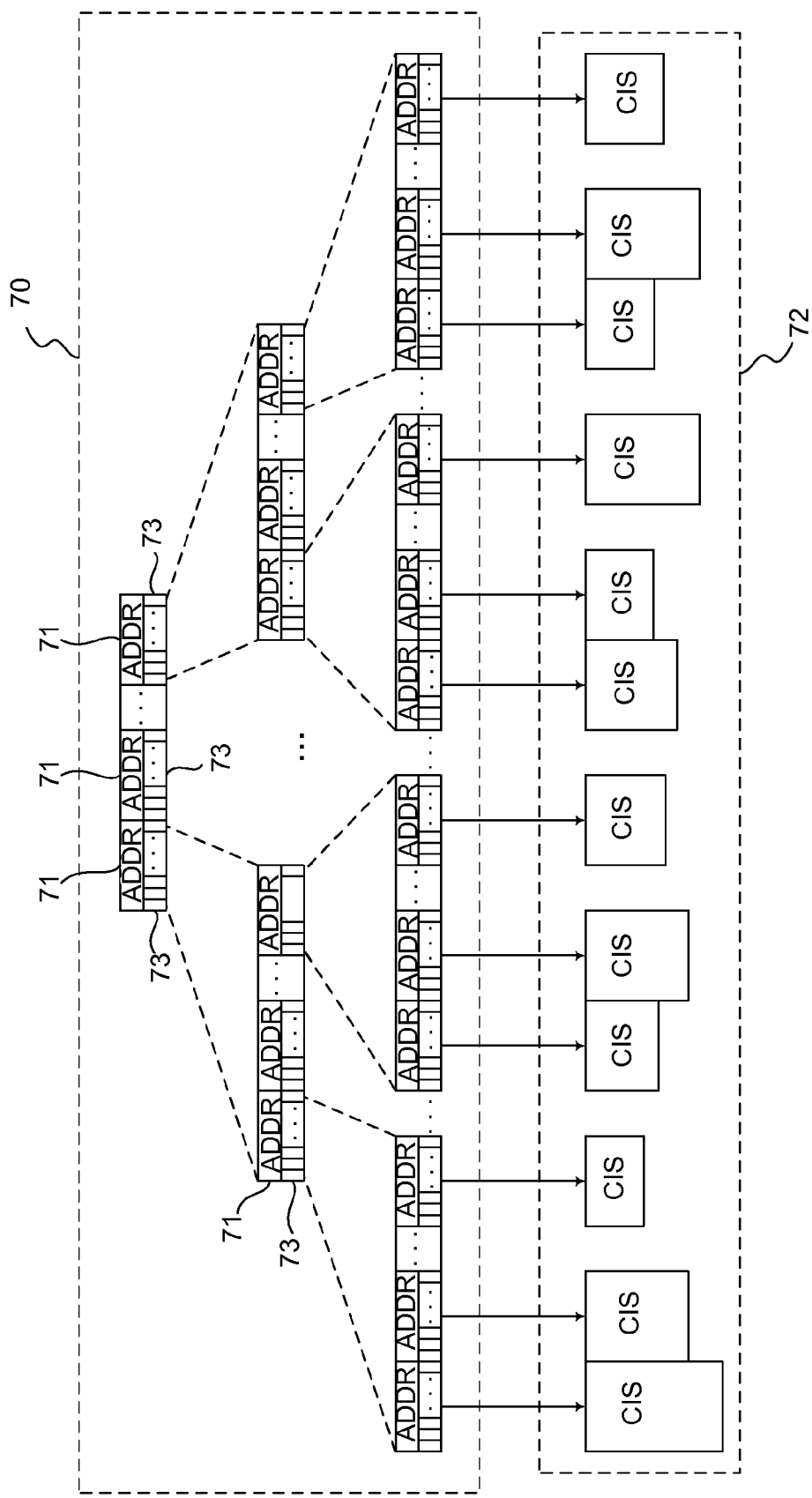
FIG. 5 illustrates a hash tree and associated collision trees.

As illustrated in FIG. 5, lookup trees 40 include a hash tree 70 and collision indicating structures 72, which can also have a tree format. Hash tree 70 can be a prefix B-tree. Each node of the tree contains the base address 71 of the branches underlying that node, and a bit mask table 73 for each branch. The bit mask table 73 indicates (e.g., with a stored "1" or "0") whether a branch or sub-node exists below that node. Although hash tree 70 can have any suitable structure and size, in the exemplary embodiment it has three levels, each with 256 sub-nodes, and with the lowest level having leaves associated with collision indicating structures (CIS) 72. Likewise, each bit mask table 73 has 256 bits. As described below, using such a hash tree 70, a group can be identified by a 32-bit (i.e., 4-byte) group identifier.

Figure 6:
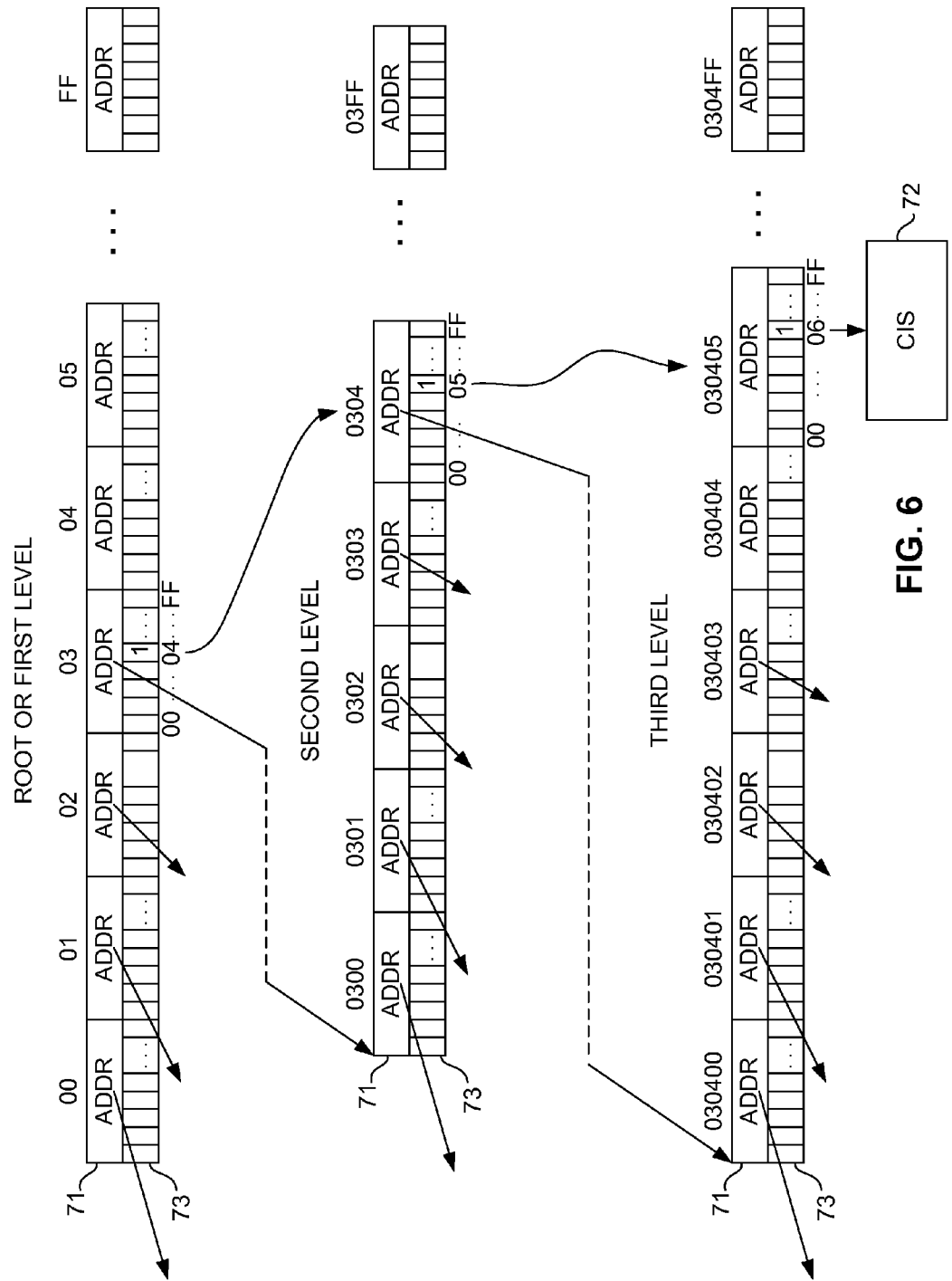
FIG. 6 illustrates an example of using a hash tree.

It can be determined whether a group corresponding to a group identifier exists in data repository 28 (and thus whether a corresponding CIS 72 exists) by inputting or applying the group identifier to hash tree 70. An example is illustrated in FIG. 6, using a group identifier represented in hexadecimal notation as 0x03040506. The first (most significant) two bytes of this exemplary group identifier indicate that bit 04 of the bitmask of sub-element 03 (of the first or root level element) is to be examined. In this example, that bit has been set to 1, which indicates that a sub-element exists on the next level. (The values of other bits are not shown for purposes of clarity.) If that bit had been set to 0, it would indicate that there is no CIS 72 to be found. The address, ADDR, points to the address of the element that exists on the next level. The next byte, 05, indicates that bit 05 of the bitmask of sub-element 0304 is to be examined. In this example, that bit has been set to 1, which indicates that an element exists on the next level. If that bit had been set to 0, it would indicate that there is no CIS 72 to be found. The address, ADDR, points to the address of the element that exists on the next level. The next byte, 06, indicates that bit 06 of the bitmask of sub-element 030405 is to be examined. In this example, that bit has been set to 1, which indicates that an element exists on the next level. As hash tree 70 in the exemplary embodiment has only three levels, the element that exists on the next level is the CIS 72. That is, the leaves of hash tree 70 are at the third level. Each leaf is associated with or corresponds to a CIS 72. Each leaf is thus also associated with or corresponds to a group. Thus, using hash tree 70, a group can be identified in response to a group identifier.

Figure 7:
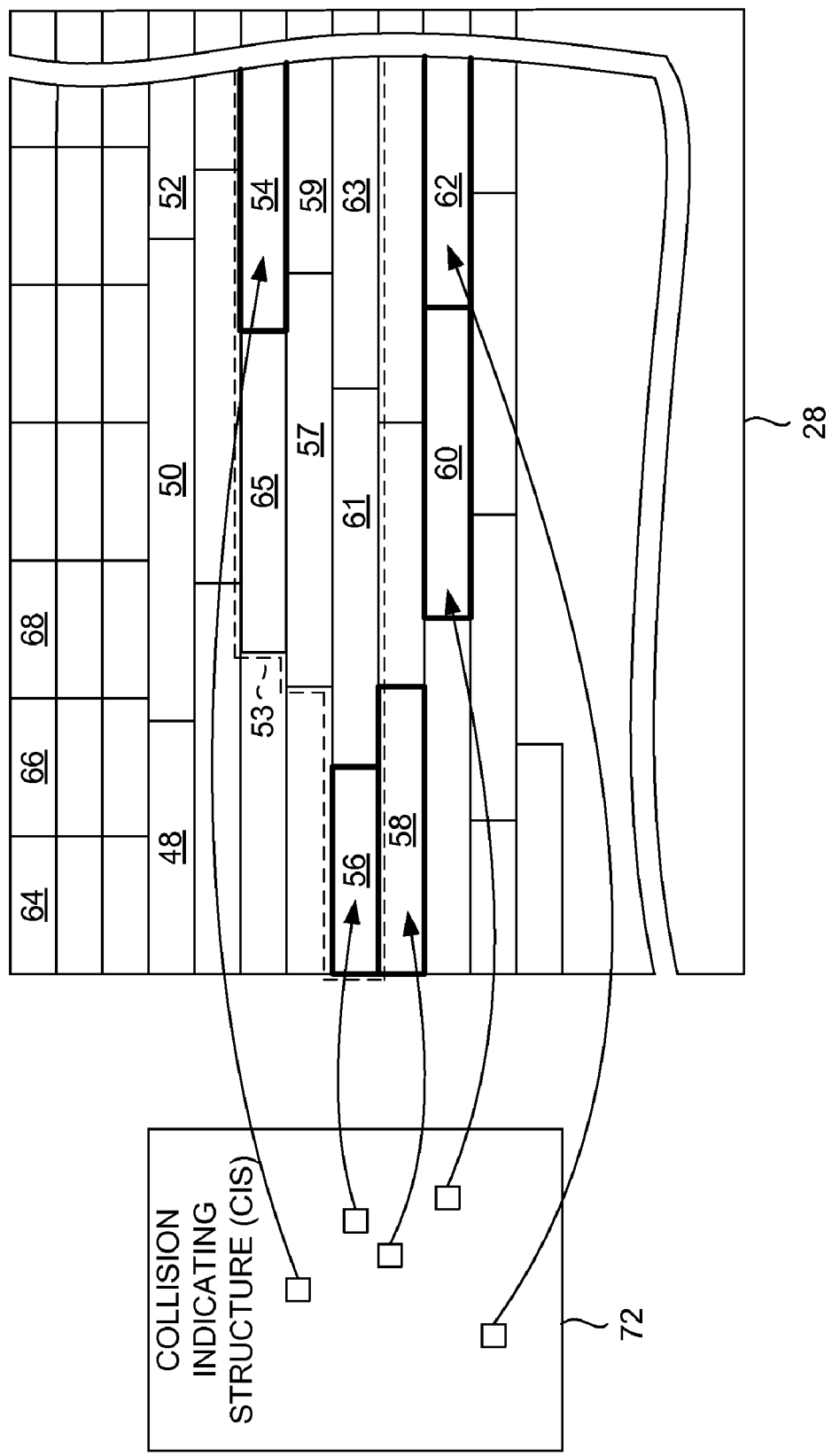
FIG. 7 illustrates relationships between collision tree elements and data repository segment locations.

As indicated in FIGS. 5 and 7, each group that is represented in data repository 28 has a CIS 72 associated with a leaf of hash tree 70 corresponding to that group. With reference to FIG. 5, a CIS 72 can be used within the group to determine an segment location at which a particular data segment is stored. CIS 72 can be any suitable type of data structure, such as a "sub-hash tree" similar to hash tree 70, a tree representing bit-wise similarities between data segments, i.e., elements in the tree, a table, or any other suitable structure. As conceptually illustrated in FIG. 5, elements, such as leaves, of CIS 72 correspond to segments (or their segment locations) in data repository 28. For example, in an embodiment in which the collision indicating structure is a tree, leaves of the tree can indicate segment locations of data segments in data repository 28.

Figure 8:
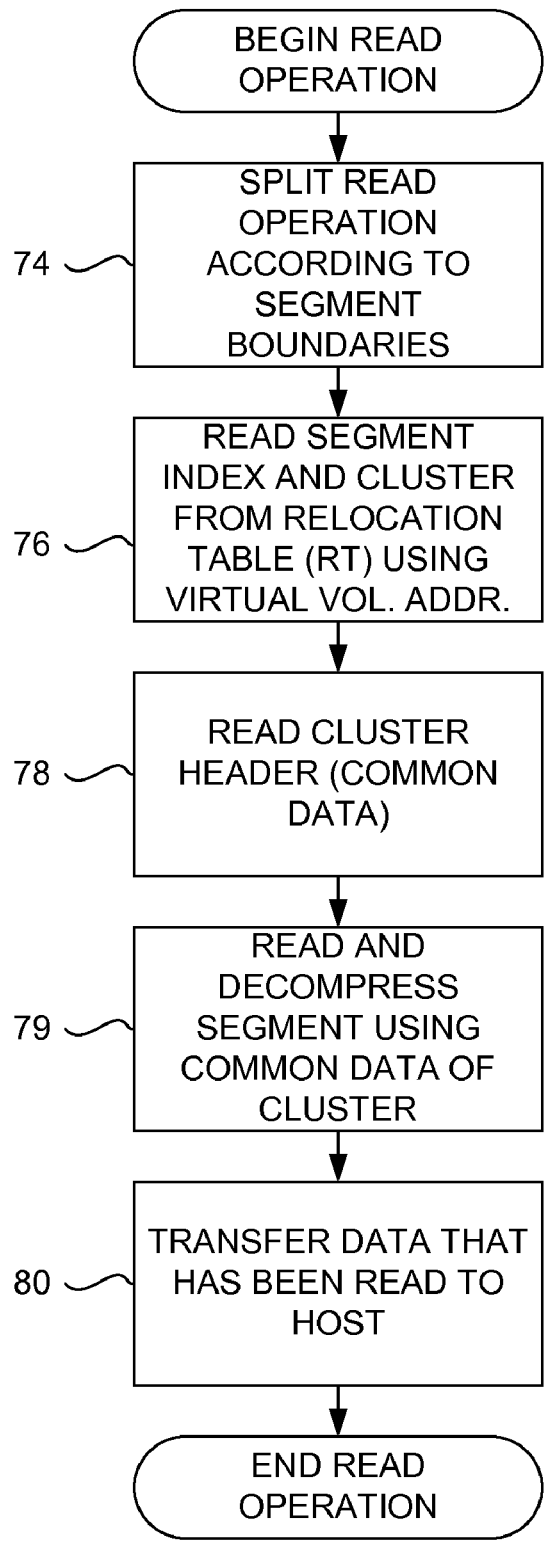
FIG. 8 is a flow diagram, illustrating a method relating to data de-duplication in connection with a read operation, in accordance with the exemplary embodiment.

As illustrated in FIG. 8, data de-duplication methods for data storage system 10 can include methods associated with a read request, i.e., a read operation, from, for example, any of hosts 14, 16, 18, etc. (FIGS. 1 and 3). As described above, such methods can be effected under the control of programmed processor system 30 (FIG. 3) in accordance with software elements such as de-duplication software 38 and read/write software 36. In view of the descriptions herein of such operations, persons of skill in the art to which the invention relates will readily be capable of creating or otherwise providing suitable software and other elements.

When a read operation is requested, indicating a virtual volume address to be read and a number of bytes to be read beginning at that address, the read operation is first split or segmented, such that the read operation can be related to a requisite number of segments (rather than bytes) to be read, as indicated by block 74 in FIG. 8. The following description applies to each segment. The location in which the requested segment is stored in data repository 28 is obtained from relocation table 42 in response to the virtual volume address, as indicated by block 76. As described above, the information read from data repository 28 can include a cluster identifier and segment identifier, and the corresponding offset stored in the header of the identified cluster can by used to identify the segment location within the cluster. The cluster header (including the cluster common data) is then read, as indicated by block 78. The segment can then be read from data repository 28 and decompressed using the common data, as indicated by block 79. Once the segment has been read and decompressed, the decompressed data can be returned to the requesting host, as indicated by block 80.

Figure 9A:
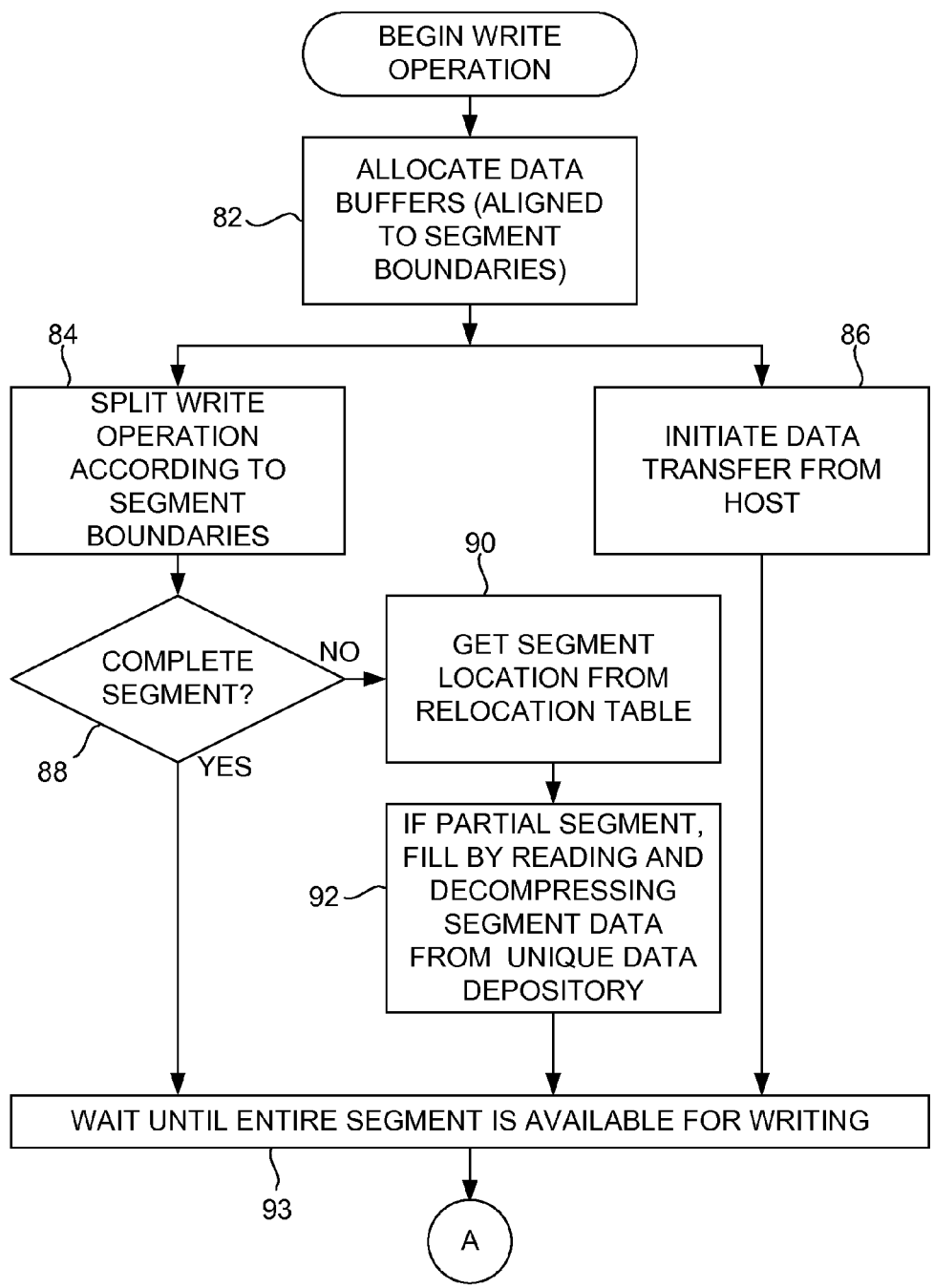
FIG. 9A is a flow diagram, illustrating a method relating to data de-duplication in connection with a write operation, in accordance with the exemplary embodiment.
Figure 9B:
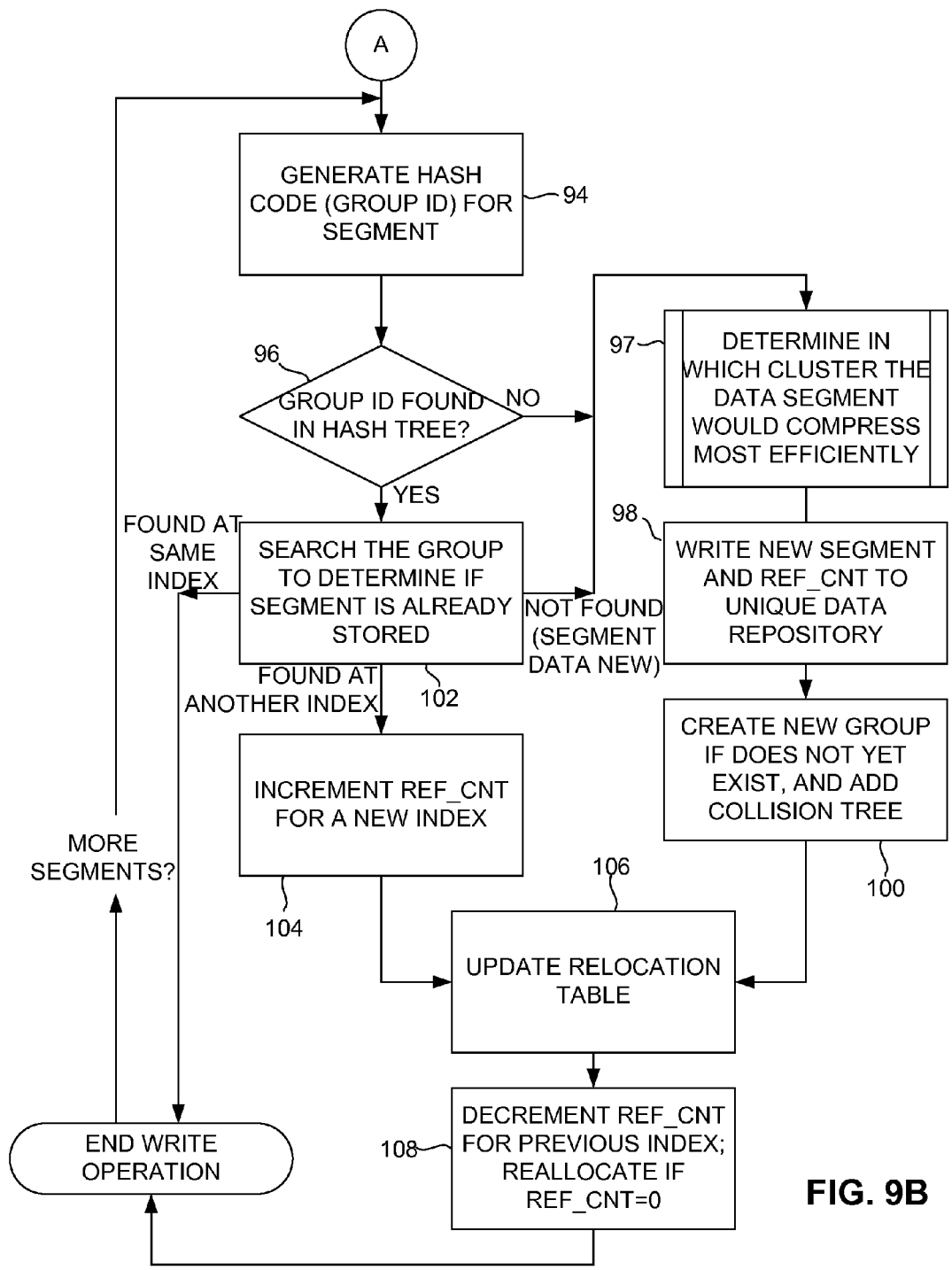
FIG. 9B is a continuation of the flow diagram of FIG. 9A.

As illustrated in FIGS. 9A-B, data de-duplication methods for data storage system 10 can also include methods associated with a write request, i.e., a write operation, from, for example, any of hosts 14, 16, 18, etc. (FIGS. 1 and 3). As described above, such methods can be effected under the control of programmed processor system 30 (FIG. 3) in accordance with software elements such as de-duplication software 38 and read/write software 36.

When a write operation is requested, data to be stored is provided (e.g., by the requesting host), along with a virtual volume address to which the data is to be written. As indicated by block 82, sufficient buffer space can first be allocated to accommodate the number of data segments corresponding to the data to be stored. The write operation can be split according to segment boundaries, such that each segment can be written in turn, as indicated by block 84. In parallel with the operations indicated by block 84 (or at such other time as may be appropriate), the data to be written is received from the requesting host, as indicated by block 86. Data storage system 10 can initiate this transfer in response to the write request, or the data can be transferred in any other suitable manner. The write operation does not proceed until an amount of data is received that is sufficient to fill a (buffer) segment. If, as indicated by block 88, the segment is not complete, i.e., the data requested to be written does not fill an entire segment, then the segment location of the partial segment is obtained from relocation table 42 in response to the corresponding virtual volume address, as indicated by block 90, and the data segment at that segment location is read from data repository 28, decompressed, and used to fill the remainder of the buffer, as indicated by block 92. The following description, with reference to FIG. 9B, applies to each data segment that is ready to be written, as indicated by block 93.

As indicated by block 94, a group identifier is generated by applying the hash algorithm to the data segment. As indicated by block 96, it is then determined whether a group corresponding to that group identifier exists in data repository 28 by applying the group identifier to hash tree 70. As described above, for each existing group, hash tree 70 has a leaf with which one of collision trees 72 is associated.

If no group corresponding to the generated group identifier exists in data repository 28, then the segment is written to, i.e., stored in, data repository 28, as indicated by blocks 97 and 98. The segment is part of a new group. In the exemplary embodiment, the cluster in which the data segment would compress most efficiently is first selected, as indicated by block 97. The method by which an optimal cluster is determined can be that described above with regard to blocks 13, 15, 17, 19, 21, 23 and 25 in FIG. 2. The compressed data segment is then stored in the selected cluster, as indicated by block 98.

A reference counter corresponding to the segment location at which the data segment is written is also added to data repository 28. An indication that the new group exists is added to hash tree 70 at the leaf corresponding to the generated group identifier, as indicated by block 100. A collision tree, which may serve as the indication, is also added to that leaf of hash tree 70, as further indicated by block 100.

If a group corresponding to the generated group identifier already exists in data repository 28, then the corresponding group in data repository 28 is searched to determined if the segment data already exists in the group, as indicated by block 102. The search can be performed in any suitable manner, such as by generating an additional hash code for each segment in the group that can then be compared to the hash codes of all other segments in the group, or by providing a tree of bit-wise differences between elements of the group. If no data segment in that group in data repository 28 matches the data segment to be written, then the segment is written to, i.e., stored in that group in data repository 28 in accordance with above-described blocks 97 and 98. However, if a data segment in the corresponding group matches the data segment to be written, then reference counters may or may not need to be updated, depending upon the segment location at which the matching data segment was found.

If the collision tree is not already in memory 34 (FIG. 3), then it is retrieved or read from disk 20 or other source. Note that although reading the collision tree from memory consumes some processing overhead and thus slows the de-duplication and overall write process, in many instances the collision tree will already be in memory 34, and in other instances (e.g., blocks 97, 98 and 100) the collision tree is not needed at all. Maintaining all or most of hash tree 70 in memory while only retrieving collision trees 72 from disks 20 or other persistent storage on an as-needed basis promotes efficiency. Also, in all but embodiments in which the desired data storage capacity is extremely large, the hash tree need not have more than three levels, along the lines of hash tree 70 shown in FIG. 5. In such embodiments, at least the first and second levels of the hash tree can be maintained in memory at essentially all times, i.e., following initialization and through all subsequent read and write operations until the system is shut down or re-initialized. In some embodiments in which the hash tree has more than two levels, the third and subsequent levels can be retrieved into memory from persistent storage on an as-needed basis, while the first and second levels are maintained in memory.

The group identifier, the data segment to be written, or any other information needed by the collision tree for it to uniquely produce a segment location in the corresponding group are applied or input to the collision tree. If the matching data segment was found at a segment location that is the same as that which the collision tree produced, then no further operations need be performed. That is, the data segment has been previously stored (presumably by the requesting host) in the same location to which it would otherwise be written. In such an instance the write operation is complete, and data storage system 10 can return an indication to the requesting host that write operation is complete. However, if the matching data segment was found at a segment location other than the ("new") segment location that the collision tree produced, then, while no data actually need be written at the new segment location, a corresponding reference counter for the new segment location is incremented to indicate an additional reference to the data segment stored at the other segment location, as indicated by block 104. As indicated by block 106, relocation table 42 is updated to reflect the new reference (following block 104) or the new group (following block 100). In an instance in which a new reference to an already-stored data segment was added to relocation table 42, the reference counter for the already-stored or "other" data segment is decremented, as indicated by block 108. Additional operations can be performed if a reference counter is decremented to zero, which would indicate that no host requires access to the data segment, such as reallocating the storage space in data repository 28 that had been allocated to that data segment. The above-referenced allocation manager can perform this and other functions relating to storage space allocation.

It should be noted that the invention has been described with reference to one or more exemplary embodiments for the purpose of demonstrating the principles and concepts of the invention. The invention is not limited to these embodiments. For example, although in the exemplary embodiment the data read and write requests originate with a host, and thus the data de-duplication occurs in an "in-line" manner on incoming data from a host, in other embodiments data read and write requests can originate with other elements, and data de-duplication can occur in a "post-processing" manner on data that already resides within a data storage system. As will be understood by persons skilled in the art, in view of the description provided herein, many variations may be made to the embodiments described herein and all such variations are within the scope of the invention.

What is claimed is:

1. A method for a data storage system having a data repository, wherein the data repository stores data segments in a plurality of clusters, each cluster including one or more compressed data segments and existing common data associated with compression of the data segments of the cluster, the method comprising:

providing a data segment to be stored in the data storage system in association with a write request;
identifying a plurality of candidate clusters of the plurality of clusters;
forming a plurality of compressed data segments, each compressed data segment corresponding to one of the candidate clusters, each compressed data segment compressed using the existing common data of the corresponding candidate cluster;
generating results of forming the plurality of compressed data segments, the results including new common data of the corresponding candidate cluster arising from a tentative addition of a compressed data segment to the corresponding candidate cluster;
evaluating the results of forming the plurality of compressed segments to determine a compression efficiency for each candidate cluster;
selecting from among all candidate clusters a candidate cluster having a compression efficiency meeting a criterion;
deleting the tentative additions of compressed data segments from candidate clusters other than the candidate cluster having the compression efficiency meeting the criterion; and
storing the compressed data segment in the data repository by adding the compressed data segment corresponding to the selected cluster and replacing the existing common data of the selected cluster with the corresponding new common data.

2. The method claimed in claim 1, wherein identifying a plurality of candidate clusters comprises identifying only clusters smaller than a predetermined maximum size as candidate clusters.

3. The method claimed in claim 1, wherein evaluating the results of forming the plurality of compressed segments comprises:
determining a common data size difference for each candidate cluster, the common data size difference representing a difference between a size of the new common data of each candidate cluster and a size of the existing common data of the candidate cluster;
selecting a candidate cluster for which the common data size difference is smaller than the common data size difference for another candidate cluster.

4. The method claimed in claim 3, wherein selecting a candidate cluster for which the common data size difference is smaller than the size difference for another candidate cluster comprises selecting a candidate cluster for which the common data size difference is smaller than the common data size difference for all other candidate clusters.

5. The method claimed in claim 1, wherein evaluating results of forming the plurality of compressed segments comprises:
determining a segment compression ratio for each candidate cluster, the segment compression ratio representing a compression ratio achieved by compressing the data segment using the existing common data of the corresponding candidate cluster; and
selecting a candidate cluster for which the segment compression ratio is larger than a segment compression ratio for another candidate cluster.

6. The method claimed in claim 5, wherein selecting a candidate cluster for which the segment compression ratio is larger than a segment compression ratio for another candidate cluster comprises selecting a candidate cluster for which the segment compression ratio is larger than a segment compression ratio for all other candidate clusters.

7. The method claimed in claim 1, wherein the data repository stores data segments in a plurality of groups, the method further comprising:
generating a group identifier in response to the data segment and a hash algorithm, each of a plurality of groups being identifiable by one of a corresponding plurality of group identifiers;
determining if a corresponding group in the data repository exists in response to the generated group identifier and a hash tree, each existing group corresponding to a leaf of the hash tree;
if no corresponding group is determined to exist in the data repository in response to the generated group identifier, storing the data segment in the data repository in a new group; and
if a corresponding group is determined to exist in the data repository in response to the generated group identifier, storing the data segment in the data repository in response to a search of the corresponding group for a stored data segment matching the data segment to be stored.

8. The method claimed in claim 7, wherein storing the data segment in a new group comprises:
creating a new group in the data repository;
associating a collision indicating structure with a leaf of the hash tree, the associated collision indicating structure indicating a segment location in the data repository;
storing the data segment at the segment location indicated by the associated collision indicating structure; and
updating a relocation table to indicate a correspondence between the segment location in which the data segment was stored and a logical address indicated by the write operation.

9. The method claimed in claim 7, wherein storing the data segment in the data repository in response to a search of the corresponding group for a stored data segment matching the data segment to be stored comprises:
determining a segment location in the data repository in response to a collision indicating structure associated with a leaf of the hash tree corresponding to the generated group identifier;
determining whether the data segment to be stored matches a previously stored data segment in the corresponding group;
if the data segment matches a previously stored data segment at the determined segment location, providing an indication that the write operation is completed without further storing the data segment in the data repository;
if the data segment matches a previously stored data segment at segment location other than the determined segment location, increasing a reference counter corresponding to the determined segment location, and decreasing a reference counter corresponding to the other segment location, and providing an indication that the write operation is completed without further storing the data segment in the data repository; and
updating a relocation table to indicate a correspondence between the other segment location and a virtual volume address indicated by the write operation.

10. A storage array system, comprising:
at least one persistent storage device defining a data repository wherein data segments are stored in a plurality of clusters, each cluster including one or more compressed data segments and existing common data associated with compression of the data segments of the cluster; and a processor system comprising at least one processor and memory, the processor system programmed or configured to:

provide a data segment to be stored in the data storage system in association with a write request;

identify a plurality of candidate clusters of the plurality of clusters;

form a plurality of compressed data segments, each compressed data segment corresponding to one of the candidate clusters, each compressed data segment compressed using the existing common data of the corresponding candidate cluster;

generate results of forming the plurality of compressed data segments, the results including new common data of the corresponding candidate cluster arising from a tentative addition of a compressed data segment to the corresponding candidate cluster;

evaluate the results of forming the plurality of compressed segments to determine a compression efficiency for each candidate cluster;

select from among all candidate clusters a candidate cluster having a compression efficiency meeting a criterion;

delete the tentative additions of compressed data segments from candidate clusters other than the candidate cluster having the compression efficiency meeting the criterion; and store the compressed data segment in the data repository by adding the compressed data segment corresponding to the selected cluster and replacing the existing common data of the selected cluster with the corresponding new common data.

11. The storage array system claimed in claim 10, wherein the processor system is programmed or configured to identify a plurality of candidate clusters by programming or configuring the processor system to identify only clusters smaller than a predetermined maximum size as candidate clusters.

12. The storage array system claimed in claim 10, wherein the processor system is programmed or configured to evaluate the results of forming the plurality of compressed segments by programming or configuring the processor system to:

determine a common data size difference for each candidate cluster, the common data size difference representing a difference between a size of the new common data of each candidate cluster and a size of the existing common data of the candidate cluster;

select a candidate cluster for which the common data size difference is smaller than the common data size difference for another candidate cluster.

13. The storage array system claimed in claim 12, wherein the processor system is programmed or configured to select a candidate cluster for which the common data size difference is smaller than the size difference for another candidate cluster by programming or configuring the processor system to select a candidate cluster for which the common data size difference is smaller than the common data size difference for all other candidate clusters.

14. The storage array system claimed in claim 10, wherein the processor system is programmed or configured to evaluate results of forming the plurality of compressed segments by programming or configuring the processor system to:

determine a segment compression ratio for each candidate cluster, the segment compression ratio representing a compression ratio achieved by compressing the data segment using the existing common data of the corresponding candidate cluster; and select a candidate cluster for which the segment compression ratio is larger than a segment compression ratio for another candidate cluster.

15. A computer program product for a data storage system, the computer program product comprising a non-transitory computer-readable medium on which is stored in computer-readable form code that when executed on the storage array system causes the storage array system to:

provide a data segment to be stored in the data storage system in association with a write request;

identify a plurality of candidate clusters of the plurality of clusters;

form a plurality of compressed data segments, each compressed data segment corresponding to one of the candidate clusters, each compressed data segment compressed using the existing common data of the corresponding candidate cluster;

generate results of forming the plurality of compressed data segments, the results including new common data of the corresponding candidate cluster arising from a tentative addition of a compressed data segment to the corresponding candidate cluster;

evaluate the results of forming the plurality of compressed segments to determine a compression efficiency for each candidate cluster;

select from among all candidate clusters a candidate cluster having a compression efficiency meeting a criterion;

delete the tentative additions of compressed data segments from candidate clusters other than the candidate cluster having the compression efficiency meeting the criterion; and store the compressed data segment in the data repository by adding the compressed data segment corresponding to the selected cluster and replacing the existing common data of the selected cluster with the corresponding new common data.

16. The computer program product claimed in claim 15, wherein the processor system is programmed or configured to identify a plurality of candidate clusters by programming or configuring the processor system to identify only clusters smaller than a predetermined maximum size as candidate clusters.

17. The computer program product claimed in claim 15, wherein the processor system is programmed or configured to evaluate the results of forming the plurality of compressed segments by programming or configuring the processor system to:

determine a common data size difference for each candidate cluster, the common data size difference representing a difference between a size of the new common data of each candidate cluster and a size of the existing common data of the candidate cluster;

select a candidate cluster for which the common data size difference is smaller than the common data size difference for another candidate cluster.

18. The computer program product claimed in claim 17, wherein the processor system is programmed or configured to select a candidate cluster for which the common data size difference is smaller than the size difference for another candidate cluster by programming or configuring the processor system to select a candidate cluster for which the common data size difference is smaller than the common data size difference for all other candidate clusters.

19. The computer program product claimed in claim 15, wherein the processor system is programmed or configured to evaluate results of forming the plurality of compressed segments by programming or configuring the processor system to:

determine a segment compression ratio for each candidate cluster, the segment compression ratio representing a compression ratio achieved by compressing the data segment using the existing common data of the corresponding candidate cluster; and select a candidate cluster for which the segment compression ratio is larger than a segment compression ratio for another candidate cluster.

20. The computer program product claimed in claim 19, wherein the processor system is programmed or configured to select a candidate cluster for which the segment compression ratio is larger than a segment compression ratio for another candidate cluster by programming or configuring the processor system to select a candidate cluster for which the segment compression ratio is larger than a segment compression ratio for all other candidate clusters.

* * * * *